United States Patent

[11] 3,585,486

[72] Inventors Laszlo Gyugyi
 Penn Hills;
 Brian R. Pelly, Murrysville, both of, Pa.
[21] Appl. No. 835,075
[22] Filed June 20, 1969
[45] Patented June 15, 1971
[73] Assignee Westinghouse Electric Corporation
 Pittsburgh, Pa.

[54] AN ELECTRICAL CONVERTER SYSTEM EMPLOYING A CONTROL CONVERTER FOR CONTROLLING THE OPERATION OF A POWER CONVERTER
 9 Claims, 1 Drawing Fig.

[52] U.S. Cl. .................................................. 321/7,
 321/66, 321/69
[51] Int. Cl. ...................................................... H02m 5/14,
 H02m 5/30

[50] Field of Search ........................................... 321/5, 7,
 60, 61, 65, 66, 69

[56] References Cited
 UNITED STATES PATENTS
 3,152,297 10/1964 Peaslee.......................... 321/61
 3,431,483 3/1969 Lafuze........................... 321/69 X
 3,445,742 5/1969 Moscardi........................ 321/5 X
 3,504,265 3/1970 Toulemonde ................... 321/61 X Primary Examiner—William H. Beha, Jr.
Attorneys—F. H. Henson, C. F. Renz and M. P. Lynch ABSTRACT: A converter system utilizing a control converter operated during both the positive and negative current half cycles of the output voltage to initiate firing pulses for a power converter which can be operated in either a noncirculating current mode or a circulating current mode.

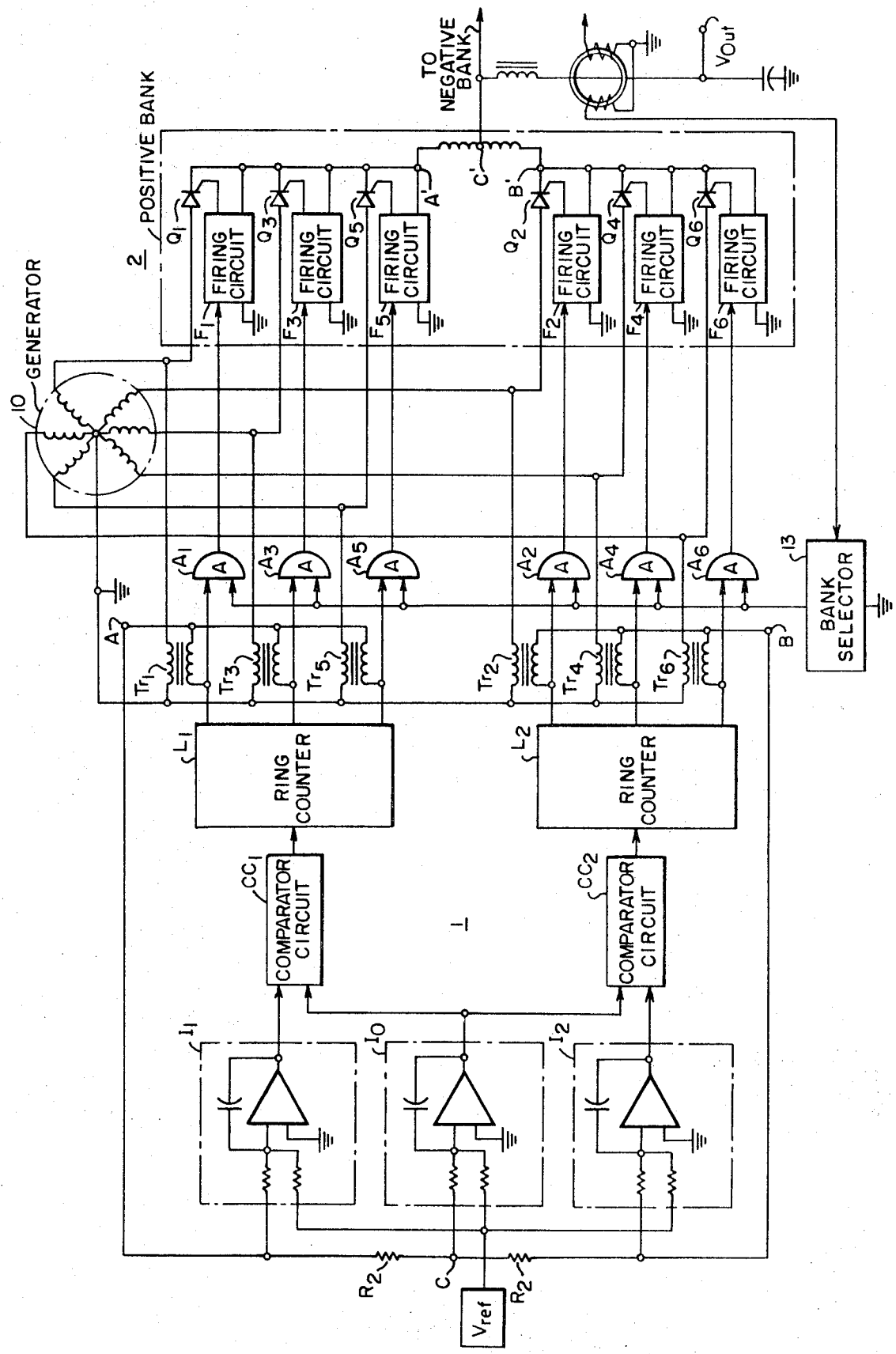

AN ELECTRICAL CONVERTER SYSTEM EMPLOYING A CONTROL CONVERTER FOR CONTROLLING THE OPERATION OF A POWER CONVERTER

CROSS REFERENCES TO RELATED APPLICATIONS

Application Ser. No. 835,074, filed concurrently herewith, by Brian R. Pelly, Laszlo Gyugyi and John Rosa, and assigned to the same assignee as the present invention.

BACKGROUND OF THE INVENTION

A cycloconverter basically consists of a pair of inversely connected converter circuits (a positive and negative bank) which is often referred to as a dual converter.

The above-identified related application, Ser. No. 835,074, discloses a novel method of determining the firing pulses of a cycloconverter circuit based on the integral or average value of the converter output waveform. This method is in contrast to the instantaneous waveform values utilized in the conventional sine wave intersecting technique. The integral method of determining firing pulses produces a distortion-free, repetitive converter output waveform. A complete discussion of this novel method of determining firing pulses and a description of a typical embodiment of this method is presented in the above-identified application, therefore it is considered unnecessary to include herein a lengthy discussion of the integral control method.

It is however significant to note that the embodiment of the novel integral method in the reference application depicts a converter circuit operating in a circulating current mode wherein the thyristor-type switches of both the positive and negative banks are continuously conducting and a current is permitted to circulate between the positive and negative banks. In many applications particularly in variable-speed, constant-frequency (VSCF) generating systems of the type utilized in aircraft, it is desirable to operate the converter in a noncirculating current mode wherein the negative and positive banks of the converter are permitted to conduct only during the negative or positive current half cycles respectively, and thus no circulating current is permitted to flow between them.

SUMMARY OF THE INVENTION

It is an object of this invention to provide a converter system utilizing the integral control method of determining the firing instants of a converter operating in a noncirculating current mode.

A control converter operated during both the positive and negative half cycles, similar to a power converter operating in a circulating current mode, generates firing pulses based on the integral method disclosed in the reference application and simultaneously initiates corresponding firing pulses in a power converter that is operating in either a noncirculating current mode or a circulating current mode. The independent mode of operation of the power converter is provided by implementing the integral firing instant determination totally within the control converter.

DESCRIPTION OF THE DRAWING

The drawing is a block schematic circuit diagram of one bank of an integrally controlled cycloconverter system in accordance with the invention.

DESCRIPTION OF THE PREFERRED EMBODIMENT

Referring to the drawing there is illustrated a 6-pulse cycloconverter system comprising a control converter 1 and a power converter 2. The 6-pulse cycloconverter illustrated is merely representative of one converter configuration and as such, the following discussion is equally applicable to 9-pulse, twelve-pulse, 12-pulse, converter configurations in either the parallel arrangement depicted, a serial arrangement or the equally well-known bridge arrangement. Furthermore for the purpose of clarity only one bank, the positive bank of the power converter 2, is illustrated. The negative bank (not shown) is a duplicate of the positive bank. In the operation of the power converter 2 in a noncirculating current mode, the bank selector 13 determines which bank is conductive, thereby rendering the other bank nonconductive.

The control converter 1 represents the integrally controlled circulating converter described in detail in the reference application, and therefore its operation in conjunction with the power converter 2 will be limited to that considered necessary for a clear understanding of the invention.

In the 6-pulse converter configuration illustrated, the six output voltages of the main generator 10 are stepped down by transformers $Tr_1$ to $Tr_6$ to a level corresponding to the level of the reference voltage $V_{ref}$. The transformers form two groups ($Tr_1$, $Tr_3$, $Tr_5$ and $Tr_2$, $Tr_4$, $Tr_6$) such that the generator voltages connected to each group represents a set of balanced three-phase voltages.

One end of the secondary of each transformer in one group is periodically switched to ground by one of the two three-stage ring counters $L_1$ and $L_2$. The output stages of the ring counters of the integrally controlled control converter 1 include bilateral switching elements that conduct positive as well as negative current. Since only one stage of each ring counter can be ON at a given instant of time, only one transformer is switched "in" from each group during a given instant of time. Thus at any given time on voltage of each of the two 3-pulse sets appears at point A, and point B, respectively. The voltage present at point A is fed to the summing point associated with the integrator comprising operational amplifier $I_1$, and the voltage at point B is fed to the summing point associated with the integrator comprising operational amplifier $I_2$. The arithmetic mean of these two voltages, obtained at the junction of the two resistors $R_2$, is fed to the integrator comprising operational amplifier $I_0$. The reference voltage $V_{ref}$ is also supplied to each of the integrator amplifiers $I_0$, $I_1$ and $I_2$. The polarity of the reference voltage with respect to the "-switched-in" line to neutral voltages is such that at the summing point of the integrators the difference of these voltages appears. The outputs of the integrators $I_0$ and $I_1$ are supplied to the comparator circuit $CC_1$, and the outputs of the integrators $I_0$ and $I_2$ are supplied to the comparator circuit $CC_2$. As described in the copending reference application, the comparator circuit generates output pulses when a predetermined relationship exists between the output of the integrator $I_0$ and the integrators $I_1$ and $I_2$. The output pulses increment the ring counter from one ON state to another ON state thereby "-switching-in" successive line to neutral voltages from the generator 10. Therefore the stepped down generator voltages are "switched-in" in a cyclic order. Thus, at points A and B, the voltage waveforms are typical 3-pulse half-wave and point C typical 6-pulse half-wave cycloconverter waveforms.

The output of the power converter is not connected to the control converter and thus the power converter does not contribute to the operation of the control converter.

The outputs of the secondaries of the transformers $Tr_1$–$Tr_6$ are connected through six, two-input AND gates $A_1$–$A_6$, to six firing circuits, $F_1$–$F_6$, which provides the firing pulses to the cycloconverter thyristors $Q_1$–$Q_6$. The AND gates are also controlled by the bank selector circuit 13, which inhibits the gating signals if the polarity of the output current is not appropriate for the respective thyristors.

Since the firing of the thyristors in the power converter 2 are initiated by the output of the ring counters $L_1$ and $L_2$; the operation of the power cycloconverter 2 is in perfect synchronism with the control converter 1. The power converter reproduces the output waveform of the control converter at the required power level. Thus, for example, the ON states of the three stages of the ring counter $L_1$ correspond to the conduction intervals of the thyristors $Q_1$, $Q_3$ and $Q_5$; and the ON states of the ring counter $L_2$ correspond to the conduction intervals of the thyristors $Q_2$, $Q_4$ and $Q_6$. Similarly, the low level voltage waveforms obtained at points A5 B and C correspond to the voltage waveforms of the power converter generated at points A', B' and C'. The voltage waveforms generated by the control converter are scaled down replicas of the waveforms generated by the power converter.

Thus we have effectively provided a control circuit which operates as a lower power converter similar to one bank of the power cycloconverter, but which is operated during both the positive and negative output current half cycles such that the power converter 2 is permitted to operate in a noncirculating current mode with one bank operated independently of the other bank.

Various modifications may be made within the scope of this invention.

We claim:

1. A converter system, comprising, a first and second converter, each of said converters generating output waveforms in response to firing pulses, a main voltage source, said second converter being coupled to said main voltage source, a reference voltage source, said first converter connected to receive potential from said main voltage source and coupled to said reference voltage source to generate firing pulses as a function of the reference voltage waveform, switching means associated with said first converter, said switching means are operated by the firing pulses of said first converter, said switching means initiating the firing pulses of said second converter, said second converter reproducing the output waveform of the first converter at a desired power level; said first converter including first means for determining the average value of the output waveform of said first converter, second means for determining the average value of said reference waveform, and third means for producing said first converter firing pulses when the average value of said reference waveform and the average of said first converter output waveform approximate a predetermined relationship.

2. A converter system as claimed in claim 4 wherein said first converter is a low-power control converter.

3. A converter system as claimed in claim 4 wherein the operation of said switching means synchronizes the firing pulses of said first and second converter.

4. A converter system as claimed in claim 1 wherein said first converter-switching means include bilateral switching elements which are capable of conducting during both the positive and negative current half cycles of the output voltage.

5. A converter system as claimed in claim 1 wherein said first converter represents a low-power converter, said main voltage supplied to said control converter at reduced voltage levels.

6. A converter system as claimed in claim 5 wherein the amplitude of the main voltage supplied to said first converter approximates the amplitude of the reference voltage.

7. A converter system as claimed in claim 1 wherein said second converter is operated in a noncirculating current mode.

8. A converter system as claimed in claim 1 wherein said first converter is operated in a circulating current mode.

9. A converter system as claimed in claim 1 wherein said first and second converters are cycloconverters.